April 21, 1953 R. COLTON 2,636,062
ELECTROCHEMICAL CELL AND SELF-VENTING ENCLOSURE THEREFOR
Filed Nov. 19, 1949
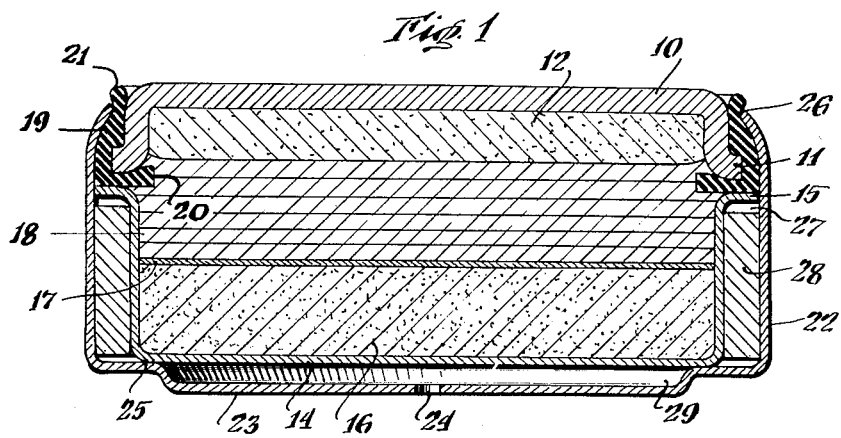
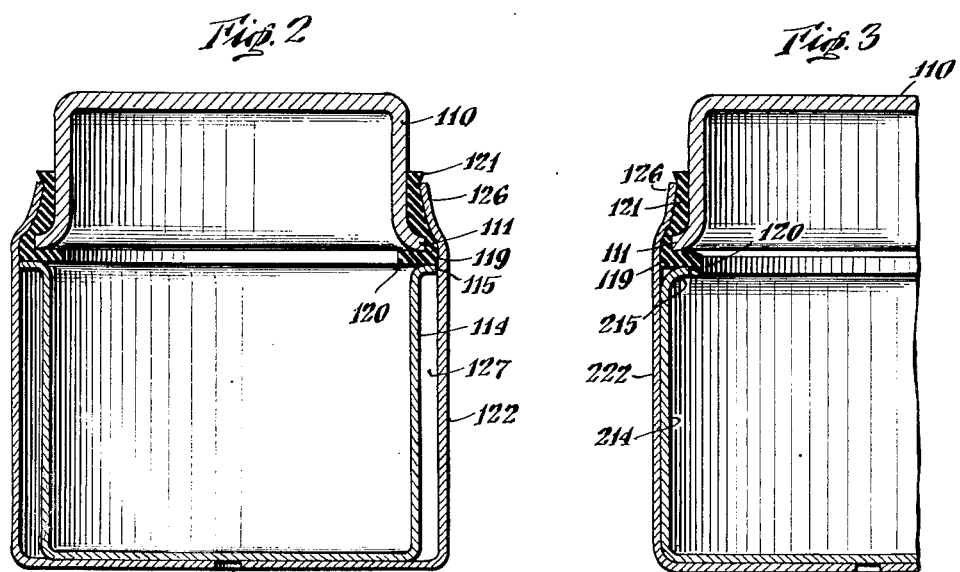
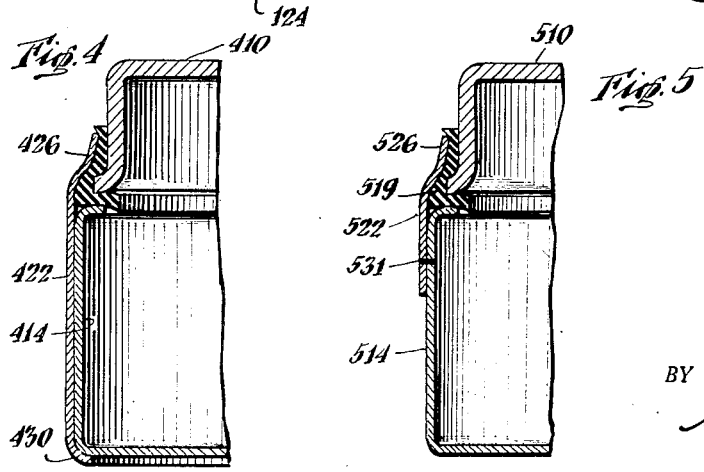
INVENTOR.
Robert Colton
BY
Nicholas Laus
ATTORNEY Patented Apr. 21, 1953

2,636,062

UNITED STATES PATENT OFFICE 2,636,062

ELECTROCHEMICAL CELL AND SELF-VENTING ENCLOSURE THEREFOR

Robert Colton, New Rochelle, N. Y., assignor to P. R. Mallory & Co., Inc., Indianapolis, Ind., a corporation of Delaware Application November 19, 1949, Serial No. 128,403

15 Claims. (Cl. 136—133)

This invention relates to electrochemical cells and, more particularly, to electrical current producing cells, such as primary and secondary cells, and to an improved air-tight enclosure for such cells.

The invention is particularly applicable to dry cells of the type disclosed in U. S. Patent No. 2,422,045, granted to Samuel Ruben. Broadly considered, the cells disclosed in this patent comprise an amalgamated zinc anode, a cathode of a depolarizer material including an electrolytically reducible oxygen yielding compound, such as electrolytically reducible oxides and permanganates, and an alkaline electrolyte such as an aqueous solution of an alkali metal hydroxide initially containing a substantial quantity of dissolved zinc. The electrolyte is immobilized against free motion or flow from the anode to the cathode, or vice versa, preferably by means which physically space them apart and comprise absorbent or minutely porous and ionically permeable inert material whereby migration of impurities and deleterious materials from one electrode to the other is inhibited.

In alkaline dry cells of the described character, it is of critical importance to provide an airtight enclosure for the cell. An enclosure of such character is desirable first to positively prevent leakage of the strongly corrosive alkaline electrolyte and also to prevent contact of such electrolyte with the atmosphere which would cause the absorption of carbon dioxide therefrom with subsequent progressive conversion of the alkali metal hydroxide into an alkali metal carbonate. While under normal conditions no gas is generated in the cell on shelf life or during actual use, particularly in the presence of small impurities in the cell materials, gas generation may occur, giving rise to substantial increase in internal pressure. If there were no provision made for the release of such pressure, the cell may bulge or be otherwise deformed and in extreme cases may even explode. For this reason, it has been found necessary to incorporate a suitable venting device into the cell enclosure which becomes operative upon the development of excessive internal pressures to release the gases accumulated within the cell enclosure.

The requirements which a venting device had to satisfy were quite exacting. First of all, the device had to assure the desired air-tight sealing of the cell in the absence of excessive internal pressure and had to become operative upon the internal pressure exceeding an accurately predetermined maximum safe value. Also, the device, upon being operated, had to permit the escape of gas while positively preventing the simultaneous escape of electrolyte or of reduced mercury from the cell. Finally, it was highly desirable that the venting device automatically restores the original air-tightly sealed character of the cell after the internal pressure had been reduced to a normal or safe value. In the past, considerable difficulty was experienced with venting devices of the described character and it was found to be particularly difficult to provide a practical and fully satisfactory venting device having a structure sufficiently simple and inexpensive to be incorporated in primary and secondary cells of small size.

It is an object of the present invention to improve venting devices of the described general type.

It is another object of the present invention to provide an electrical current producing cell, such as a primary or secondary cell, comprising a novel and improved venting device.

It is a further object of the invention to provide a novel venting device for electrochemical cells which will positively respond to a predetermined increase in internal pressure to release and to discharge such pressure and which is automatically closed after normal internal pressure has been restored.

Other and further objects and advantages of the invention will become apparent from the following description taken in conjunction with the accompanying drawing, in which:

Figure 1 is a vertical sectional view of a cell embodying the present invention;

Figure 2 is a similar view of a modified embodiment of the present invention; and Figures 3, 4 and 5 are vertical sectional views, somewhat fragmentary in character, of further modified embodiments of the invention.

Referring now more particularly to Fig. 1 of the drawing, a preferred embodiment of the invention will be described, as applied to an alkaline dry cell of the general type disclosed in the aforesaid Ruben patent. Reference numeral 10 denotes an anode container or cup formed of a metal having, when amalgamated, a low electrolytic potential difference with respect to zinc, such as copper, or a suitable copper base alloy. Container 10 is of a generally dished or cup-shaped configuration and is provided with an outwardly extending circumferential flange 11. A body 12 of a suitable anode material, such as amalgamated zinc powder, is compressed with the inner space of the anode container.

Cathode container 14 is preferably formed of steel, is likewise substantially cup-shaped and is provided with an outwardly extending circumferential flange 15 around its mouth portion. A cathode body 16 of depolarizing material, such as, for instance, mercuric oxide with a small amount of graphite admixed thereto, is compressed in the lower portion of cathode container 14. Across the upper surface of the depolarizer-cathode 16 there is placed a thin barrier layer 17 formed of a suitable ionically permeable material. Between the anode and the cathode there are provided a plurality of layers 18 of electrolyte absorbent material impregnated by a suitable electrolyte which may be an aqueous solution of potassium hydroxide containing a substantial amount of zincate therein. Instead of using a liquid electrolyte which is immobilized by being absorbed in a suitable porous material, it is also possible to add to the electrolyte a suitable gelling agent which, in the preferred case, may be an alkali metal salt of carboxy-methyl cellulose whereby the electrolyte is converted into a form-retaining elastic gel.

The anode and cathode containers or cups are faced into each other and a generally L-shaped grommet 19 of a suitable elastomer, such as synthetic rubber, polyethylene, or nylon is interposed between their cooperating flanges 11 and 15. It will be noted that the said grommet comprises a radially extending body portion 20 which is directly interposed between flanges 11 and 15 and a generally axially extending sleeve portion 21 which circumferentially surrounds the corresponding portions of anode cup 10 adjoining its flange 11. To provide a better fit of the grommet with respect to the structural elements of the cell, a special molded shape such as indicated in Fig. 1 may be used.

An outer casing or container 22 is provided around the cathode container and completely jackets the said container including the major portion of grommet 19. Outer container 22 is provided with a shallow depressed bottom portion 23 of reduced diameter having a vent opening 24 in the center thereof. The remainder of the bottom surface of outer container 22 provides, at 25, a seat for the bottom surface of cathode container 14. The upper edge or mouth portions of the outer container are radially constricted or crimped as shown at 26 around the sleeve portion 21 of the grommet, to maintain said sleeve portion under compression in the axial direction and, at the same time, maintaining the radially extending portion 20 of the grommet under axial compression. Due to the fact that, thus, the grommet is under strong compression in two different directions, the anode and cathode containers with the interposed portions of the grommet therebetween provide an air-tightly sealed enclosure for the cell.

As it will be observed in Fig. 1, an annular space 27 is defined between the outer circumferential surface of the cathode container and the corresponding inner surface of the outer container. An annular body 28 of a suitable absorbent material, such as kraft paper, is provided in this interspace for reasons which will appear presently. A similar interspace 29 is defined between the bottom surfaces of cathode container 14 and outer container 22. Interspace 29 will permit a slight bulge of the inner cell case as a result of a slight increase in internal pressure without producing a dimension change in the external cell structure.

From the foregoing description, the operation of the cell embodying the invention will be readily understood by those skilled in the art. In the normal assembled condition of the cell illustrated in the drawing, the anode and cathode containers are maintained in air-tightly sealed relation and, at the same time, are electrically insulated from each other by means of the grommet 19 interposed between flanges 11 and 15. However, if at any time during the life of the cell excessive internal pressures develop, such pressure will cause slight axial displacement of the anode and cathode containers from each other. This displacement, which is quite limited and is generally in the order of only a few hundredths of an inch, will tend to increase the pressure applied to the sleeve portion 21 of the grommet and, thus, will prevent the escape of any gas in that direction. At the same time, the flanges 11 and 15 will be slightly displaced from each other, partially releasing the axial pressure normally maintained on the radially extending body portion 20 of the grommet. The result will be that the internal pressure will cause the gas to flow around the flange 15 of cathode container 14 into the interspace 27 between the cathode container and the outer container, such pressure being harmlessly released through vent hole 24 which is in direct communication with the external atmosphere.

It has been found that the pressure contact between grommet 19 and flange 15 and the pressure contact between the outer container and the cathode container in the region 25 provides a passageway of sufficiently restricted character as to counteract the possibility of escape of appreciable quantities of liquid electrolyte together with the escaping gas. In the event, however, that small amounts of such electrolyte escape, they will be absorbed and retained in annular body 28 of absorbent material. If desired, a body of metal capable of forming an amalgam with mercury, such as lead, may be provided in interspace 29 to immobilize any metallic mercury that may escape during venting.

It will be noted that, in the cell shown in Fig. 1, anode container 10 constitutes, at the same time, one of the terminals of the cells whereas outer container 22, which is in direct electrical pressure contact with the cathode container 14, constitutes the other terminal of the cell.

It has been found that the combination airtight cell closure and venting device of the invention provides various important advantages. Thus, first of all, a positively air-tight seal of the cell container is obtained which, at the same time, allows cell venting to occur at an internal pressure which can be quite accurately determined. The venting device forming a part of the present invention is not only self-opening in response to an excessive increase in internal pressure but is also of a self-closing character and will restore the cell to its original air-tightly sealed condition upon the internal pressure having been reduced to its normal value. The cell closure and venting device is quite simple in construction and can be readily applied to cells on a practical and industrial scale at a low cost. Furthermore, the finished cell combines great structural strength with accurately maintained dimensional characteristics, which is an important consideration in the quantity production of cells and batteries.

The modified embodiment of the invention shown in Fig. 2 is in many respects closely similar to the one just described and similar reference numerals have been used to denote corresponding parts. Also, illustration of the internal cell elements or electrodes have been omitted for the sake of simplicity as they do not form part of the present invention which is applicable to electrochemical cells having widely different structural and electrochemical arrangements.

The modified cell shown in Fig. 2 essentially comprises a first electrode cup 110 with an outwardly extending circumferential flange 111, a second electrode cup 114 having a similar circumferential flange 115, the said cups being faced into each other and having their cooperating marginal portions or flanges spaced from each other by an interposed elastic insulating and sealing grommet 119. It will be noted that the body portion 120 of the grommet extends between the flanges 111 and 115 in the radial direction whereas the sleeve portion 121 of the grommet extends axially of the cell and surrounds the marginal regions of electrode cup 110.

An outer container or jacket 122 completely surrounds electrode cup 114 with its bottom surface in contact with the corresponding surface of cup 114. The mouth portions of the outer container are radially constricted or crimped at 126 around the sleeve portion 121 of the grommet thereby maintaining the entire assembly in a position in which the two electrode cups define with the interposed grommet an air-tightly sealed internal cell space. A vent opening 124 is provided in the bottom center of outer container 122 and is in restricted communication with the interspace 127 defined between electrode container 114 and outer container 122.

The operation of this modified form of the invention is closely similar to that of the embodiment shown in Fig. 1 and will be readily understood without any detailed description. It will be sufficient to state that the two electrode cups are capable of limited axial displacement away from each other in response to the building up of excessive internal pressure. The presence of such pressure and the resulting relative axial displacement of the cups will permit gas to be discharge underneath body portion 120 of grommet 119 around the edge or flange of electrode container 114 into interspace 127 and finally through vent hole 124 into the atmosphere. Since the bottom portions of electrode container 114 and outer container 122 are in pressure contact over a substantial area, this will restrict the communication of interspace 127 with the vent hole to a sufficient extent to prevent escape of any electrolyte together with the discharged gas. However, as a further safety measure, a body of absorbent material (not shown) may be provided in interspace 127 in the same manner as is shown in Fig. 1.

The modification of the invention shown in Fig. 3 is practically identical in structure with that described in connection with Fig. 2 and the same reference numerals have been used to denote the corresponding parts. However, the flange or edge 215 of the second electrode container 214 is extended inwardly rather than outwardly. Furthermore, the outer jacket or container 222 is so dimensioned that it forms a close fit with the electrode container 214 throughout its circumferential and bottom portions. This form of the invention operates in a manner exactly identical to the embodiments of the invention shown in Figs. 1 and 2. Due to the fact that the interspace between electrode container 214 and the outer container 222 is extremely restricted, it provides some assurance against the escape of any electrolyte together with the released gas so that it is generally unnecessary to provide any absorbent material in such interspace. However, an extra covering of absorbent cardboard may be provided around the cell as an additional protection, in case the electrolyte leakage is sufficiently pronounced.

The embodiment of the invention shown in Fig. 4 is likewise closely similar to the ones described in the foregoing and particularly to the one shown in Fig. 3. However, in this form of the invention the outer container is replaced with a shell or collar 422 which is open at both ends thereof. One end of this shell is radially constricted around the grommet at 426 while its other end is crimped at 430 around the bottom edge of anode container 414. It will likewise be noted that outer shell is provided in tightly fitting relation around the circumferential portions of electrode container 414 thereby defining therewith a greatly constricted interspace. Upon venting, the gas released from the inner cell space has to pass through this constricted interspace into the atmosphere which will provide some protection against the escape of any electrolyte with the escaping gas. As a further protection, an additional covering of absorbent cardboard, or the like, may be provided around the cell in such a manner as to surround the regions of the cell where some electrolyte leakage may occur. Since the outer shell or jacket 422 exposes the bottom portion of electrode container 414, this bottom surface may directly constitute one of the terminals of the cell, while the other terminal of the cell is constituted by the first electrode cup 410.

In the form of the invention shown in Fig. 5, the shell or collar holding the two electrode cups 510 and 514 in the assembled air-tightly sealed and insulated relation is reduced to a relatively narrow annular member or band 522 which encircles only the marginal regions of the two electrode cups and the corresponding portions of the interposed grommet 519. One end of band 522 is radially constricted around the grommet at 526 while its other end is spot welded to the electrode container 514 at a number of circumferentially spaced spots 531 thereby securing the said band to the electrode container. From the foregoing description, and due to its similarity to the modifications previously described, the operation of this form of the invention should be obvious.

While the present invention has been described in connection with a few preferred embodiments thereof, variations and modifications may be resorted to by those skilled in the art without departing from the principles of the present invention. Thus, it will be readily appreciated that the sealed enclosure and automatic venting device of the invention may be used for electrical current producing cells, such as primary or secondary cells, of widely different internal structure and chemical composition. Also, the advantages of the invention are not limited to electrical current producing cells but equal or similar advantages may be obtained in electrochemical cells of other types, such as, for instance, in electrolytic condensers and the like. The bottom surface of the outer jacket can be ribbed or otherwise reinforced for greater structural strength. Moreover, while all of the structures described in the foregoing include flanged cup members, cups with straight drawn walls and pinched-off edges could be used with equal or similar results. All of these variations and modifications are considered to be within the true spirit and scope of the present invention, as disclosed in the forego-

What is claimed is:

1. An electrochemical cell comprising, in combination, a pair of terminal cups faced into each other and having cooperating marginal regions, an insulative grommet having a first portion interposed between said regions and a second portion, and an outer jacket encircling at least the marginal regions of said cups, said jacket being fixed at one end with respect to one of said cups and being at the other end radially constricted in a region which is directly overlying and is in direct pressure contact with said second portion of the grommet for applying at said other end axial sealing pressure upon said first portion of the grommet and radial sealing pressure upon said second portion of the grommet thereby maintaining said cups and the grommet therebetween in air-tightly sealed relation but capable of limited axial venting displacement away from each other in response to excessive internal pressure, said axial displacement of the cups being effective to decrease the sealing pressure upon said first portion of the grommet and to increase the sealing pressure upon said second portion of the grommet whereby said pressure is released around the edge of one cup into the interspace between said cup and jacket while direct release of said pressure into the exterior is prevented.

2. An electrochemical cell comprising, in combination, positive and negative cell terminals having cooperating marginal edges, at least one of said terminals being cup-shaped, an insulative grommet having a body portion extending between said edges radially of the cell and a sleeve portion extending generally axially of the cell, and an annular member encircling the marginals regions of said terminals and radially constricted in a region which is directly overlying and is in direct pressure contact with said sleeve portion of the grommet for holding the body portion of the grommet under axial compression and the sleeve portion of the grommet under radial compression.

3. An electrochemical cell comprising, in combination, a pair of terminal cups, the marginal regions of said cups including portions extending axially of the cell and cooperating flanges, an insulative grommet having a body portion interposed between said flanges and a sleeve portion hugging the adjoining axially extending portion of one cup, and an annular jacket member encircling the said marginal regions of the cups, said jacket member being secured against axial displacement with respect to one of said cups and being radially constricted in a region which is directly overlying and is in direct pressure contact with the sleeve portion of said grommet thereby holding the body portion of the grommet under axial compression and the sleeve portion of the grommet under radial compression thus maintaining said cups in sealed but electrically insulated relation.

4. An electrochemical cell comprising, in combination, a pair of dished terminal members, the maginal regions of said members including outwardly flared edges, an insulative grommet having a body portion interposed between said edges and a sleeve portion hugging the adjacent portion of one terminal member, and a jacket encircling said terminal members at least in the general region of said grommet, said jacket being fixed against axial displacement with respect to one of said terminal members and being radially constricted over the sleeve portion of said grommet thereby to hold said terminal members in sealed electrically insulated relation but capable of limited axial displacement with respect to each other in response to internal pressure.

5. An electrochemical cell comprising, in combination, a pair of metal cups having flared cooperating flanges, an elastic annular grommet having a body portion interposed between said flanges radially of the cell and a sleeve portion, and a metal jacket encircling said cups at least in the region of said grommet, said jacket being substantially fixed against axial displacement with respect to one of said cups and being radially constricted in a region which is directly overlying and is in direct pressure contact with the sleeve portion of said grommet at a level spaced from the plane defining the inner space of one cup from that of the other thereby holding the body portion of said grommet under axial compression and the sleeve portion of the grommet under radial compression thus maintaining said cups in sealed insulative relation but capable of limited axial venting displacement with respect to each other in response to excessive internal pressure.

6. An electrical current producing cell comprising, in combination, a pair of metal cups having cooperating flanges, an annular sealing grommet having a body portion interposed between said flanges radially of the cell and a sleeve portion extending axially around one of said cups, and an outer jacket completely encasing the other one of said cups and having its mouth portions radially constricted around the sleeve portion of said grommet, said jacket maintaining said cups and the grommet therebetween in sealed insulative relation but capable of limited axial displacement with respect to each other in response to excessive internal pressure to release gas into the space defined between said jacket and the cup therein.

7. An electrical current producing cell comprising, in combination, a first metal cup and a second metal cup having cooperating pressure faces, cell electrodes of opposite polarity in respective contact with the inner surfaces of said cups, an annular sealing grommet having a body portion interposed between said pressure faces of the cups and a sleeve portion encircling the adjoining region of the first cup, and an outer metal container completely encasing said second cup and in electrical contact therewith, said container having its mouth portions radially constricted around the sleeve portion of said grommet thereby maintaining said cups and the grommet compressed therebetween in insulative sealing relation but capable of limited axial displacement away from each other in response to excessive internal pressure to release gas around the edge of said second cup into the interspace between said second cup and said outer container, said first cup and said outer container respectively constituting the two terminals of the cell.

8. An electrical current producing cell comprising, in combination, a first and a second metal cup having cooperating flared mouth portions faced into each other, cell electrodes of opposite polarity in respective contact with the inner surfaces of said cups, an annular sealing grommet having a portion radially extending between the mouth portions of said cups and a portion axially extending therefrom around said first cup, an outer metal container completely enclosing said second cup with portions thereof in electrical contact with and portions thereof spaced from said cup, said container having its mouth portions radially constricted around the axially extending portion of said grommet thereby holding said cups and the grommet compressed therebetween in insulative sealing relation but capable of limited axial displacement away from each other in response to excessive internal pressure to release gas around the edge of said second cup into the interspace between said second cup and said outer container, and a venting opening in said container maintaining said interspace in restricted communication with the atmosphere, said first cup and said outer container respectively constituting the two terminals of the cell.

9. An electrical current producing cell according to claim 7 wherein a body of electrolyte absorbent material is provided in the interspace between the outer container and one of the metal cups.

10. An electrical current producing cell comprising, in combination, a first and a second metal cup respectively having an outwardly and an inwardly bent flange, an annular grommet having a portion radially extending between said flanges and a sleeve portion axially extending therefrom around the first cup, an outer container completely jacketing said second cup in closely fitting contacting relation and having its mouth portions radially constricted around the sleeve portion of the grommet, and a vent opening in said container remote from its mouth portions, said outer container maintaining said cups and the grommet therebetween in insulated sealing relation but capable of limited axial displacement to release excessive internal pressure through the interspace between said container and said second cup and through said vent opening, the said interspace being sufficiently restricted to prevent the escape of electrolyte.

11. An electrical current producing cell comprising, in combination, a first and a second metal cup having cooperating flange portions facing each other, cell electrodes of opposite polarity in respective contact with the inner surfaces of said cups, an annular sealing grommet having a portion radially extending between the flange portions of said cups and a portion extending axially therefrom around said first cup, a third metal cup completely jacketing said second cup in closely fitting contacting relation and having its mouth portions radially constricted around the axially extending portion of said grommet thereby holding said first and second cups and the grommet compressed therebetween in insulative sealing relation but capable of limited axial displacement away from each other in response to excessive internal pressure to release gas around the edge of said second cup into the interspace between said second and third cups, and a vent opening in said third cup permitting the escape of such released gas into the atmosphere while preventing the escape of electrolyte as a result of the greatly constricted character of said interspace, said first and third cups respectively constituting the two terminals of the cell.

12. An electrical current producing cell comprising, in combination, a first and a second metal cup respectively having an outwardly and an inwardly bent flange, an annular grommet having a portion radially extending between said flanges and a sleeve portion axially extending therefrom around the first cup, and an outer shell open at both ends completely surrounding the circumferential portions of said second cup in closely fitting contacting relation, one end of said shell being radially constricted around the sleeve portion of said grommet and the other end of said shell being bent inwardly to engage the marginal bottom portions of said second cup, said shell maintaining said cups and the grommet therebetween in insulative sealing relation but capable of limited axial venting displacement from each other in response to excessive internal pressure.

13. An electrical current producing cell comprising, in combination, a first and a second metal cup respectively having an outwardly and an inwardly bent flange, an annular grommet having a portion radially extending between said flanges and a sleeve portion axially extending therefrom around the first cup, and an annular jacket around the marginal portions of said cups in the region of said grommet, one end of said jacket being radially constricted around the sleeve portion of said grommet and the other end of said jacket being secured to said second cup, said jacket maintaining said cups and the grommet therebetween in insulative sealing relation but capable of limited axial displacement to permit the escape of gas from the cell enclosure around the edge of said second cup and through the interspace between said second cup and said jacket.

14. The electrical current producing cell according to claim 12 wherein one end of the annular jacket is spot-welded to the corresponding cup at circumferentially spaced points.

15. An electrochemical cell comprising, in combination, first and second terminal cups faced into each other and having cooperating marginal regions, an elastic insulative grommet having a body portion interposed between said regions and a sleeve portion extending around the circumferential surface of the first cup, and an outer jacket encircling at least the marginal regions of both cups, said jacket being fixed at one end with respect to the second cup and being at the other end radially constricted in a region which is directly overlying and is in direct pressure contact with the sleeve portion of said grommet whereby said elastic sleeve portion is radially compressed between said constricted portion of the jacket and the circumferential surface of said first cup defining a radially stressed sealing zone for the cell, said constricted portion of the jacket being further effective in pulling said cups towards each other with the body portion of said grommet therebetween thereby defining an axially stressed sealing zone for the cell.

ROBERT COLTON.

References Cited in the file of this patent

UNITED STATES PATENTS

| Number | Name | Date |
|---|---|---|
| 2,060,799 | Drummond | Nov. 17, 1936 |
| 2,174,437 | Collins | Sept. 26, 1939 |
| 2,289,249 | Deibel | July 7, 1942 |
| 2,307,763 | Deibel | Jan. 12, 1943 |
| 2,457,810 | Ellis | Jan. 4, 1949 |
| 2,487,985 | Ruben | Nov. 15, 1949 |
| 2,499,239 | Williams, Jr. | Feb. 28, 1950 |
| 2,509,249 | Rhodes | May 30, 1950 |
| 2,571,616 | Ruben | Oct. 16, 1951 |

FOREIGN PATENTS

| Number | Country | Date |
|---|---|---|
| 561,820 | Great Britain | Jan. 6, 1944 |